(12) United States Patent
Chen et al.

(10) Patent No.: US 11,985,311 B2
(45) Date of Patent: May 14, 2024

(54) PREDICTION MODE SIGNALING IN VIDEO CODING

(71) Applicant: BEIJING DAJIA INTERNET INFORMATION TECHNOLOGY CO., LTD., Beijing (CN)

(72) Inventors: Yi-Wen Chen, Beijing (CN); Xianglin Wang, Beijing (CN); Xiaoyu Xiu, Beijing (CN); Tsung-Chuan Ma, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 191 days.

(21) Appl. No.: 17/591,456

(22) Filed: Feb. 2, 2022

(65) Prior Publication Data

US 2022/0159248 A1 May 19, 2022

Related U.S. Application Data

(63) Continuation of application No. PCT/US2020/049653, filed on Sep. 8, 2020.
(Continued)

(51) Int. Cl.
*H04N 19/107* (2014.01)
*H04N 19/159* (2014.01)
(Continued)

(52) U.S. Cl.
CPC ......... *H04N 19/107* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS

| 2016/0037164 A1 | 2/2016 | Joshi et al. |
| 2016/0261865 A1* | 9/2016 | Li .................. H04N 19/176 |

(Continued)

FOREIGN PATENT DOCUMENTS

| KR | 10-2016-0129075 | 11/2016 |
| KR | 10-2017-0039176 | 4/2017 |
| WO | WO2014197428 A1 | 12/2014 |

OTHER PUBLICATIONS

Beijing Dajia Internet Information Technology Co. Ltd., International Search Report and Written Opinion, PCT/US2020/049653, dated Dec. 1, 2020, 10 pgs.
(Continued)

*Primary Examiner* — Talha M Nawaz
(74) *Attorney, Agent, or Firm* — Osha Bergman Watanabe & Burton LLP

(57) ABSTRACT

A method of decoding video data, comprising: receiving, from bitstream, video data corresponding to a non-skip mode coded block; determining a parameter set associated with the non-skip mode coded block; if the parameter set satisfies a first condition, retrieving a first syntax element from the bitstream; if the parameter set satisfies a second condition, retrieving a second syntax element from the bitstream; if the parameter set satisfies a third condition, retrieving a third syntax element from the bitstream; decoding the video data corresponding to the non-skip mode coded block using palette mode when the first syntax element and the third syntax element have the first value; decoding the video data using intra prediction mode when the first syntax element has the first value and the third syntax element has a second value; and decoding the video data using inter prediction mode when the first syntax element has the second value.

15 Claims, 9 Drawing Sheets

Related U.S. Application Data

(60) Provisional application No. 62/897,292, filed on Sep. 7, 2019.

(51) Int. Cl.
  *H04N 19/176* (2014.01)
  *H04N 19/503* (2014.01)
  *H04N 19/593* (2014.01)
  *H04N 19/70* (2014.01)

(52) U.S. Cl.
  CPC ......... *H04N 19/503* (2014.11); *H04N 19/593* (2014.11); *H04N 19/70* (2014.11)

(56) References Cited

U.S. PATENT DOCUMENTS

| | | | |
|---|---|---|---|
| 2016/0277761 A1* | 9/2016 | Li | H04N 19/126 |
| 2017/0054976 A1* | 2/2017 | Li | H04N 19/70 |
| 2017/0070748 A1* | 3/2017 | Li | H04N 19/115 |
| 2019/0281312 A1* | 9/2019 | Chen | H04N 19/119 |

OTHER PUBLICATIONS

Beijing Dajia Internet Information Technology Co. Ltd., Examination Report, IN202247002975, dated May 26, 2022, 6 pgs.
Beijing Dajia Internet Information Technology Co. Ltd., Notice of Office Action, KR10-2022-7001670, dated Apr. 7, 2022, 15 pgs.
Benjamin Bross et al., Versatile Video Coding (Draft 6), Joint Video Experts Team (JVET) of ITU-T SG 16 WP 3 and ISO/IEC JTC 1/SC 29/WG 11, Document: JVET-O2001-vE, 15th Meeting, Gothenburg, SE, Jul. 3-12, 2019, 455 pgs.
Jianle Chen et al., Algorithm description for Versatile Video Coding and Test Model 5 (VTM 5), Joint Video Experts Team (JVET) of ITU-T SG 16 WP 3 and ISO/IEC JTC 1/SC 29/WG 11, Document: JVET-N1002-v2, 14th Meeting: Geneva, CH, Mar. 19-27, 2019, 79 pgs.
Miska M. Hannuksela, AHG12: Sub picture based partitioning and decoding, Joint Video Experts Team (JVET) of ITU-T SG 16 WP 3 and ISO/IEC JTC 1/SC 29/WG 11, Document: JVET-N0046, 14th Meeting, Geneva, CH, Mar. 19-27, 2019, 4 pgs.
C. Rosewarne et al., High Efficiency Video Coding (HEVC) Test Model 16 (HM 16) Encoder Description Update 10, Joint Collaborative Team on Video Coding (JCT-VC) of ITU-T SG16 WP3 and ISO/IEC JTC1/SC29/WG11, Document: JCTVC-AI10020v1, 35th Meeting, Geneva, CH, Mar. 22-27, 2019, 72 pgs.
Beijing Dajia Internet Information Technology Co., JP2022-503403, Decision of Refusal, dated Jan. 10, 2023, 8 pgs.
Beijing Dajia Internet Information Technology Co., First Office Action, JP2022-503403, dated Aug. 2, 2022, 8pgs.
Notification of Reasons for Refusal issued in Japanese Application No. 2022-503403, mailed on Mar. 22, 2024 (18 pages).

* cited by examiner

PREDICTION MODE SIGNALING IN VIDEO CODING

CROSS-REFERENCE TO RELATED APPLICATIONS

The present application is a continuation of PCT Application No. PCT/US2020/049653, entitled "PREDICTION MODE SIGNALING IN VIDEO CODING" filed on Sep. 8, 2020, which claims priority to U.S. Provisional Application No. 62/897,292, entitled "PREDICTION MODE SIGNALING IN VIDEO CODING" filed on Sep. 7, 2019, both of which are incorporated by reference in their entirety.

TECHNICAL FIELD

The present application generally relates to video data encoding and decoding, and in particular, to method and system for prediction modes signaling in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method for prediction modes signaling in video coding.

According to a first aspect of the present application, a method of decoding video data is performed at a computing device having one or more processors and memory storing a plurality of programs to be executed by the one or more processors. The method comprises: receiving, from bitstream, video data corresponding to a non-skip mode coded block; determining a parameter set associated with the non-skip mode coded block; if the parameter set satisfies a first condition, retrieving a first syntax element from the bitstream; if the parameter set satisfies a second condition, retrieving a second syntax element from the bitstream; if the parameter set satisfies a third condition, retrieving a third syntax element from the bitstream; decoding the video data corresponding to the non-skip mode coded block using palette mode when the first syntax element and the third syntax element have the first value; decoding the video data using intra prediction mode when the first syntax element has the first value and the third syntax element has a second value; and decoding the video data using inter prediction mode when the first syntax element has the second value.

According to a second aspect of the present application, a computing device includes one or more processors, memory and a plurality of programs stored in the memory. The programs, when executed by the one or more processors, cause the computing device to perform operations as described above.

According to a third aspect of the present application, a non-transitory computer readable storage medium stores a plurality of programs for execution by a computing device having one or more processors. The programs, when executed by the one or more processors, cause the computing device to perform operations as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
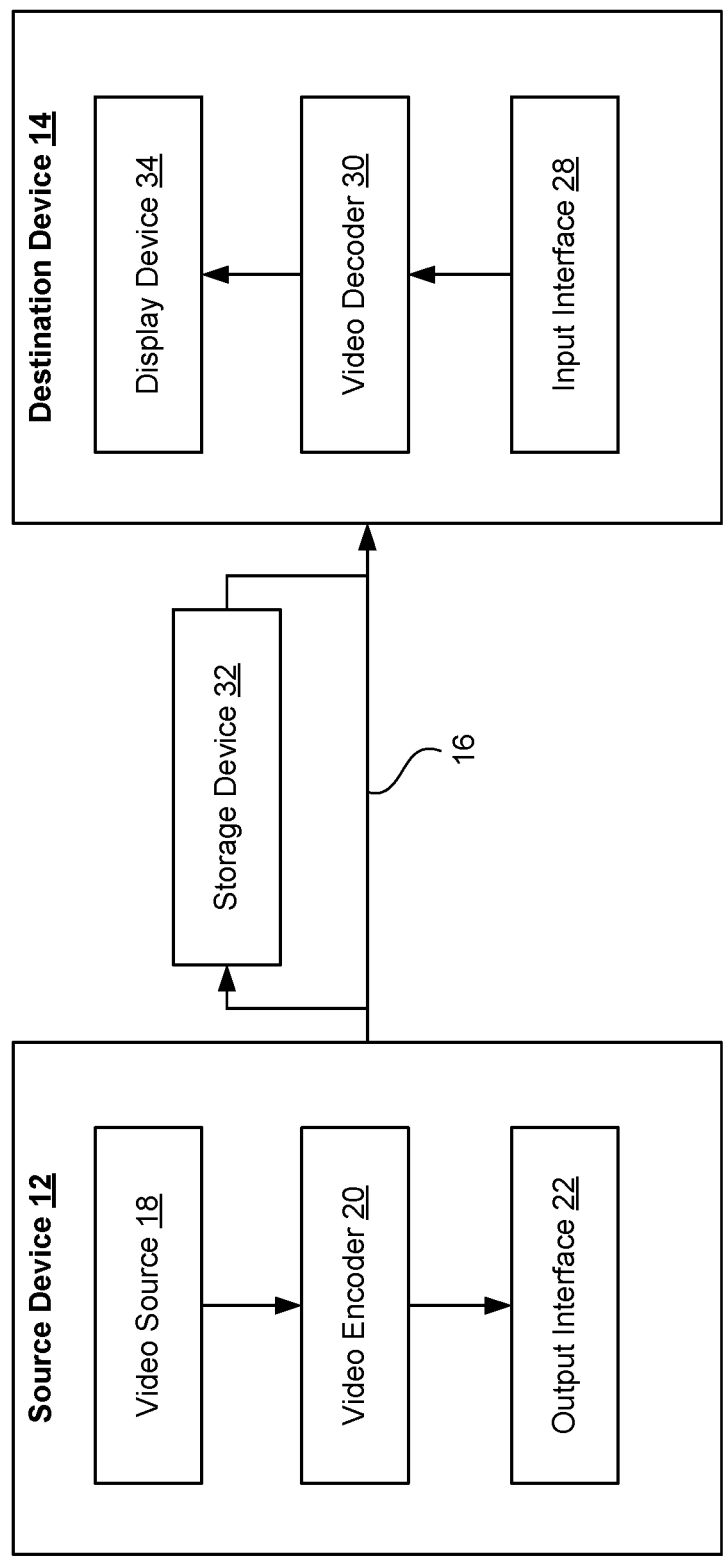
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
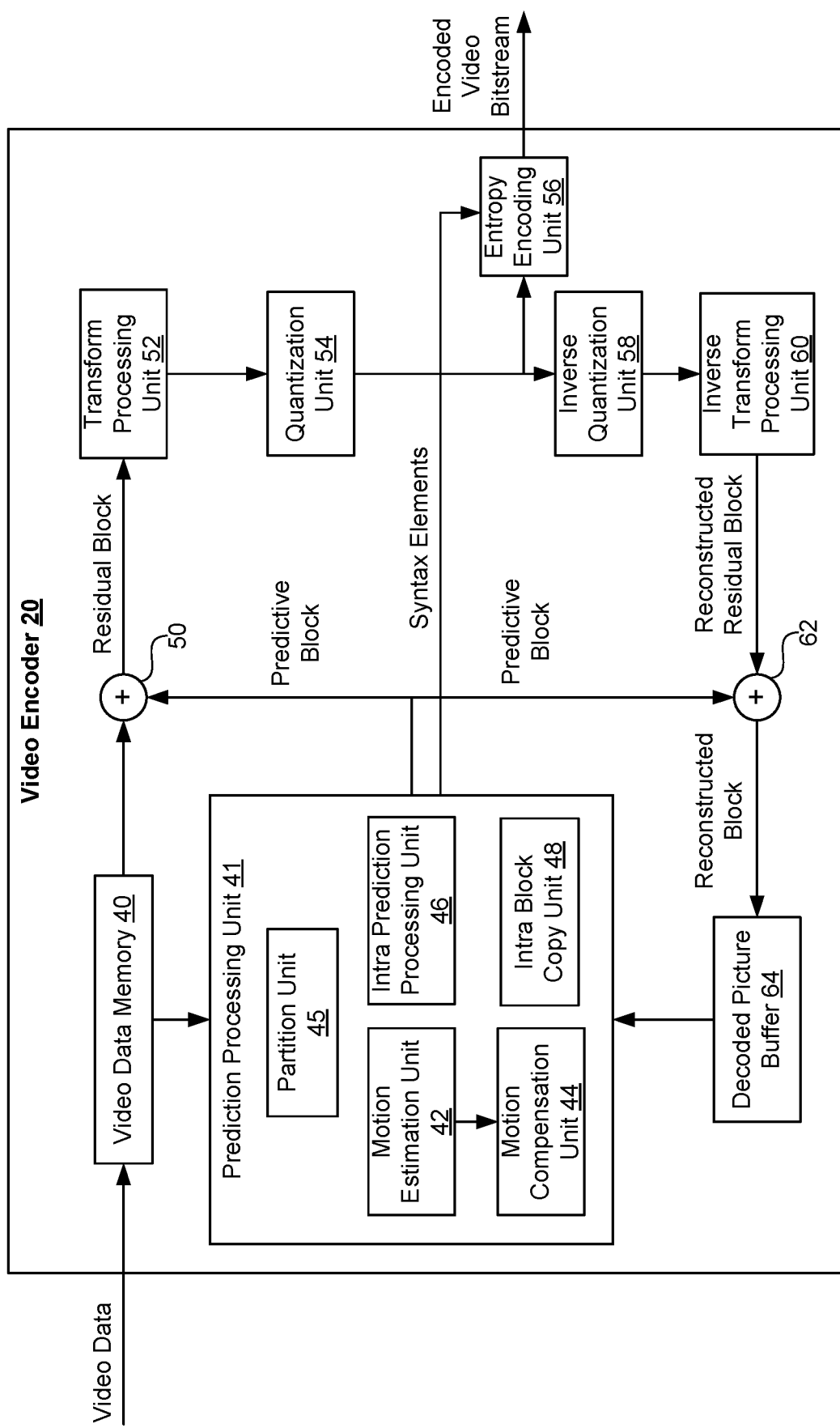
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
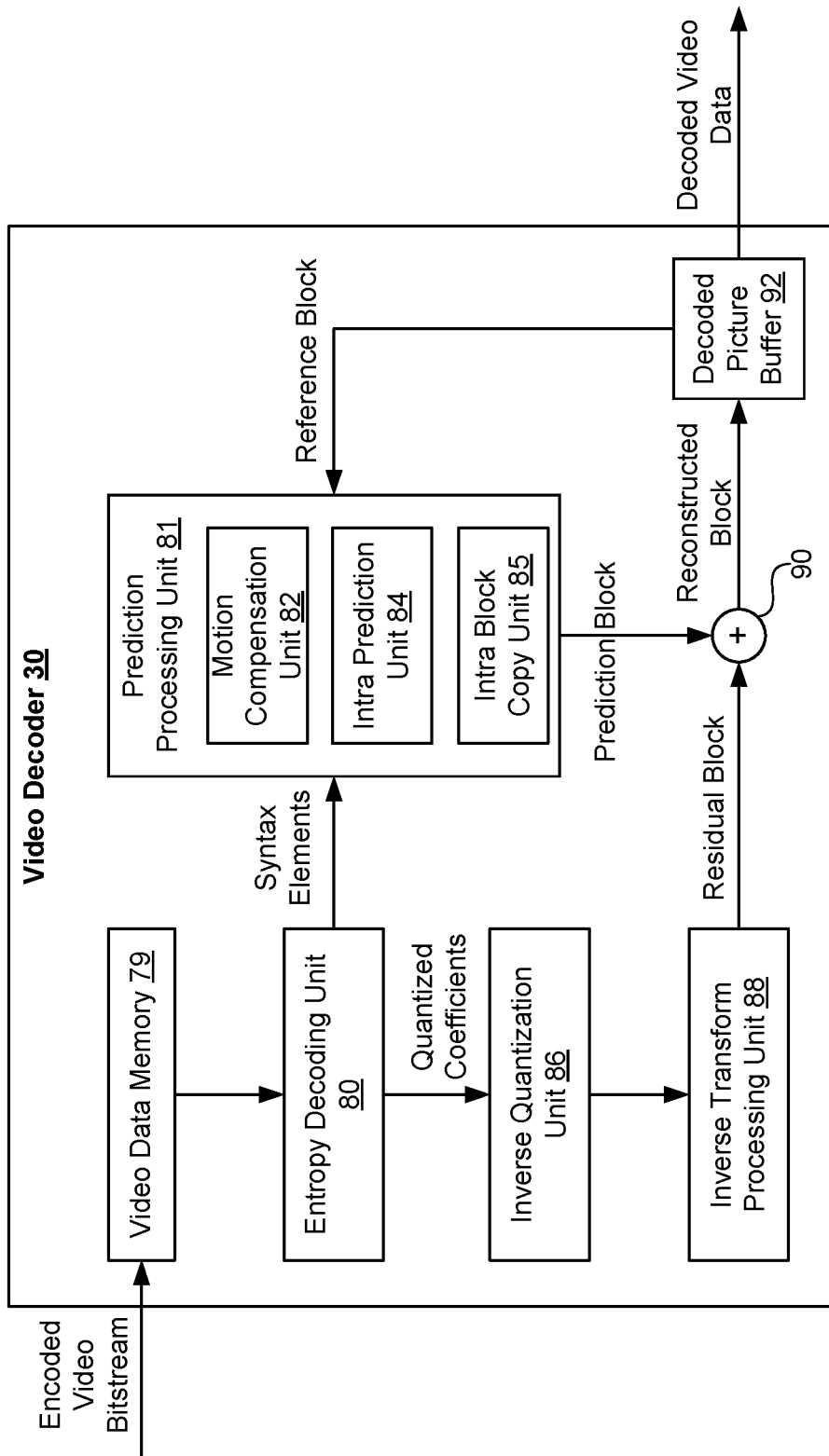
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra-prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
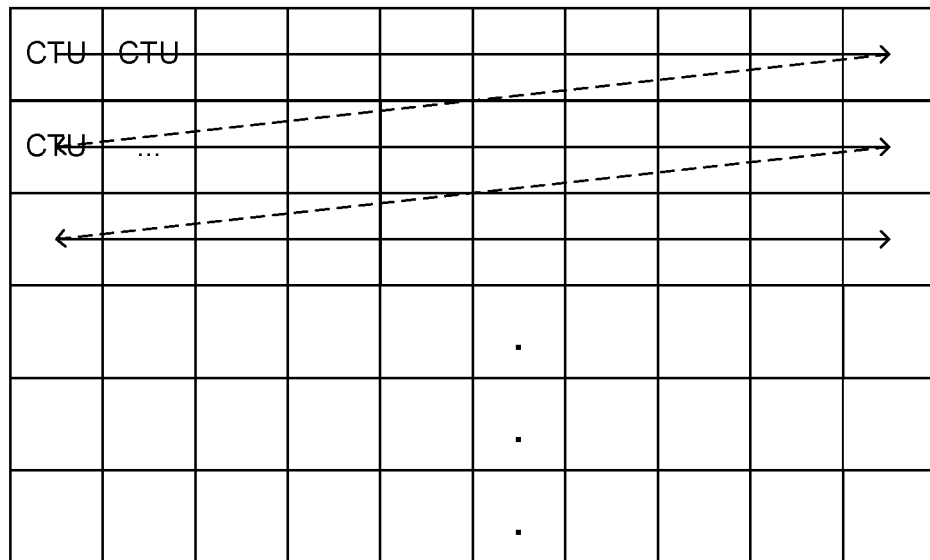
FIGS. 4A-4E are block diagrams illustrating how a frame is recursively quad-tree partitioned into multiple video blocks of different sizes in accordance with some implementations of the present disclosure.
Figure 4B:
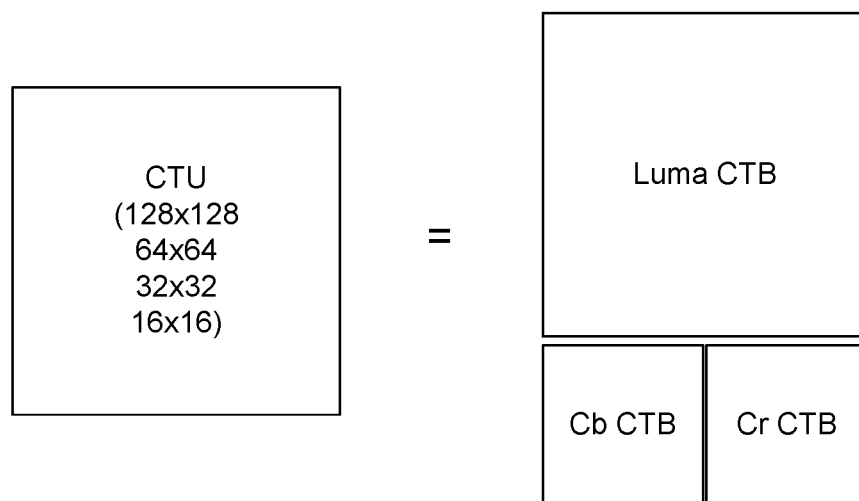

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
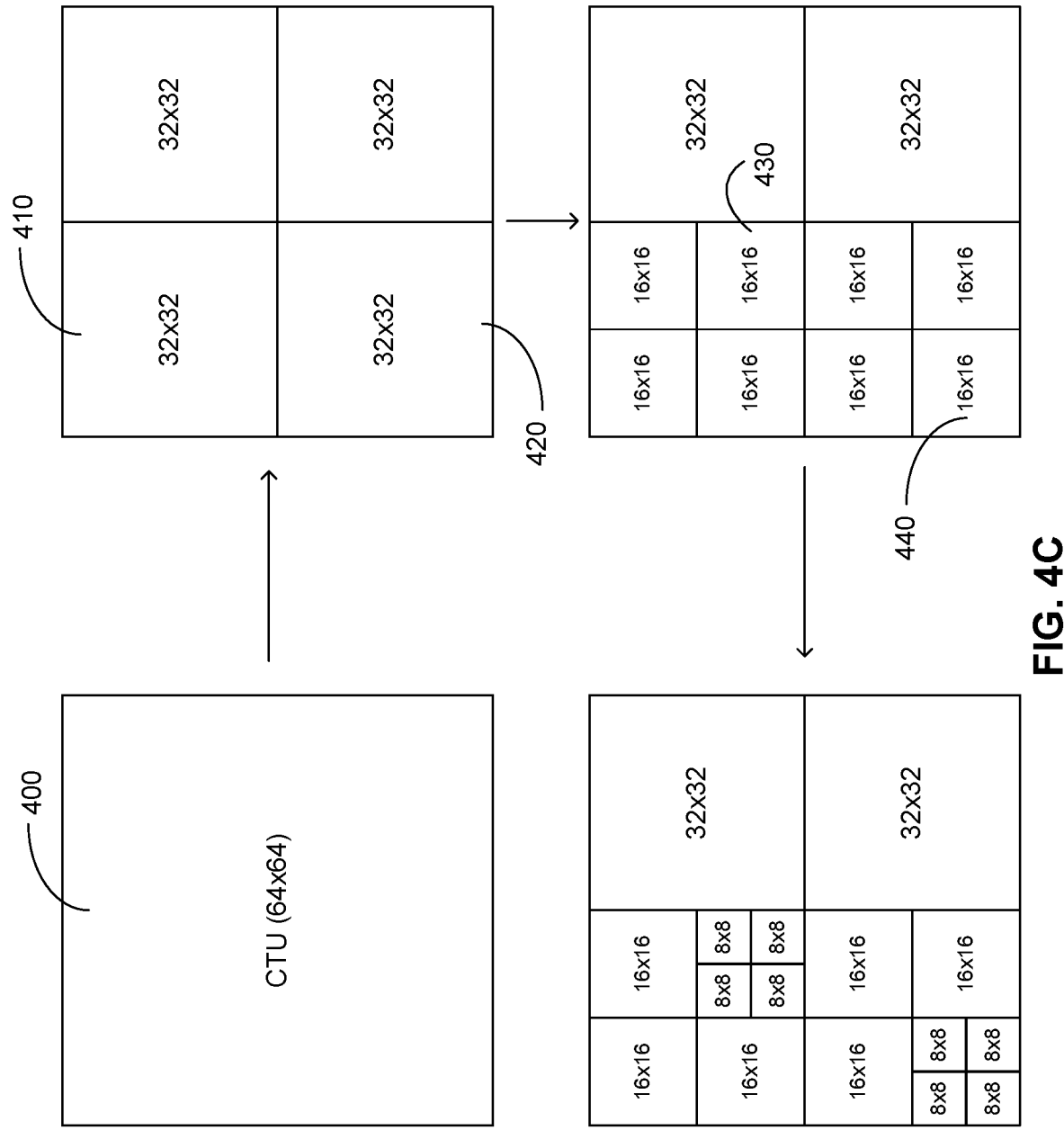
Figure 4D:
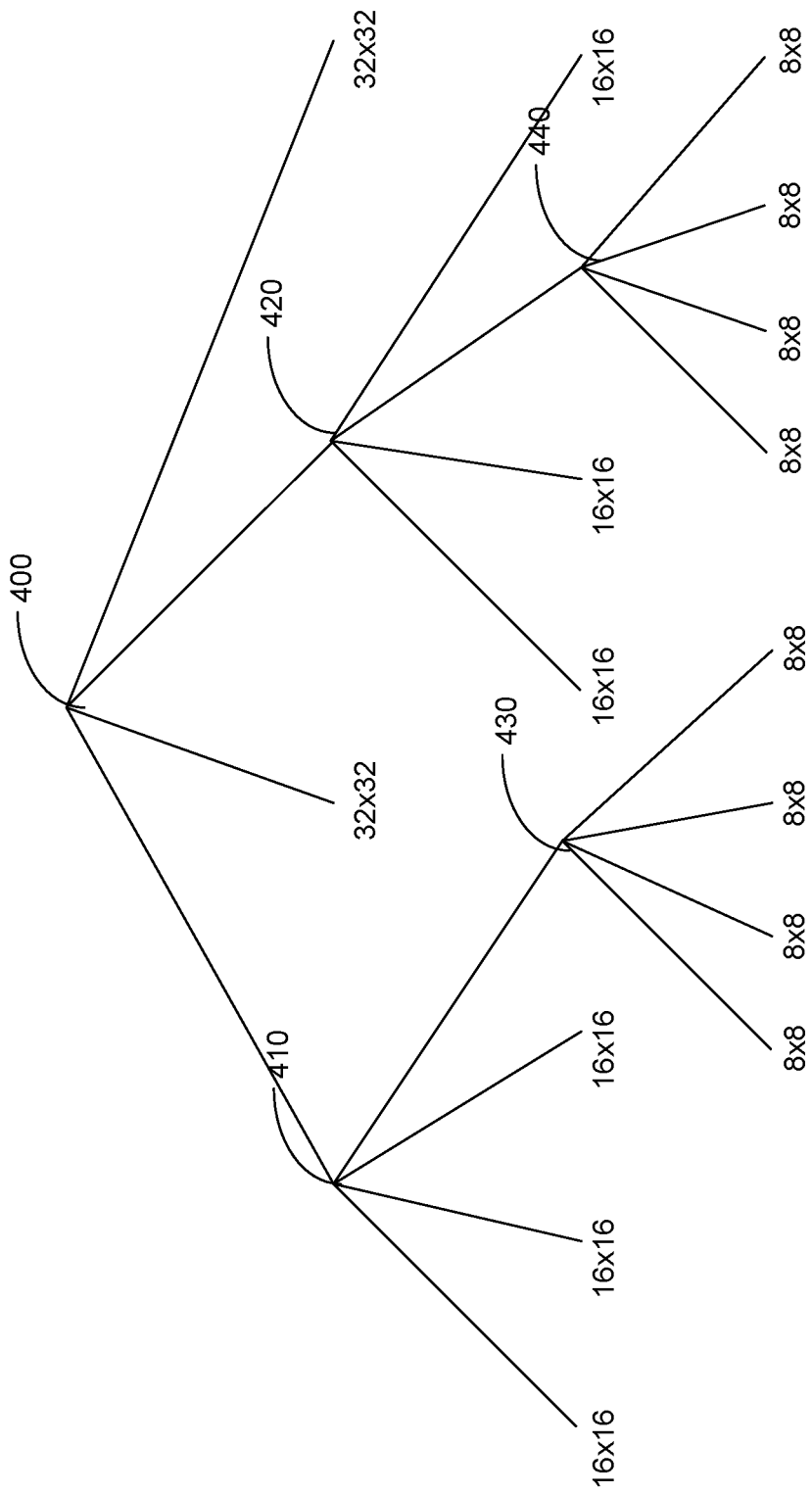
Figure 4E:
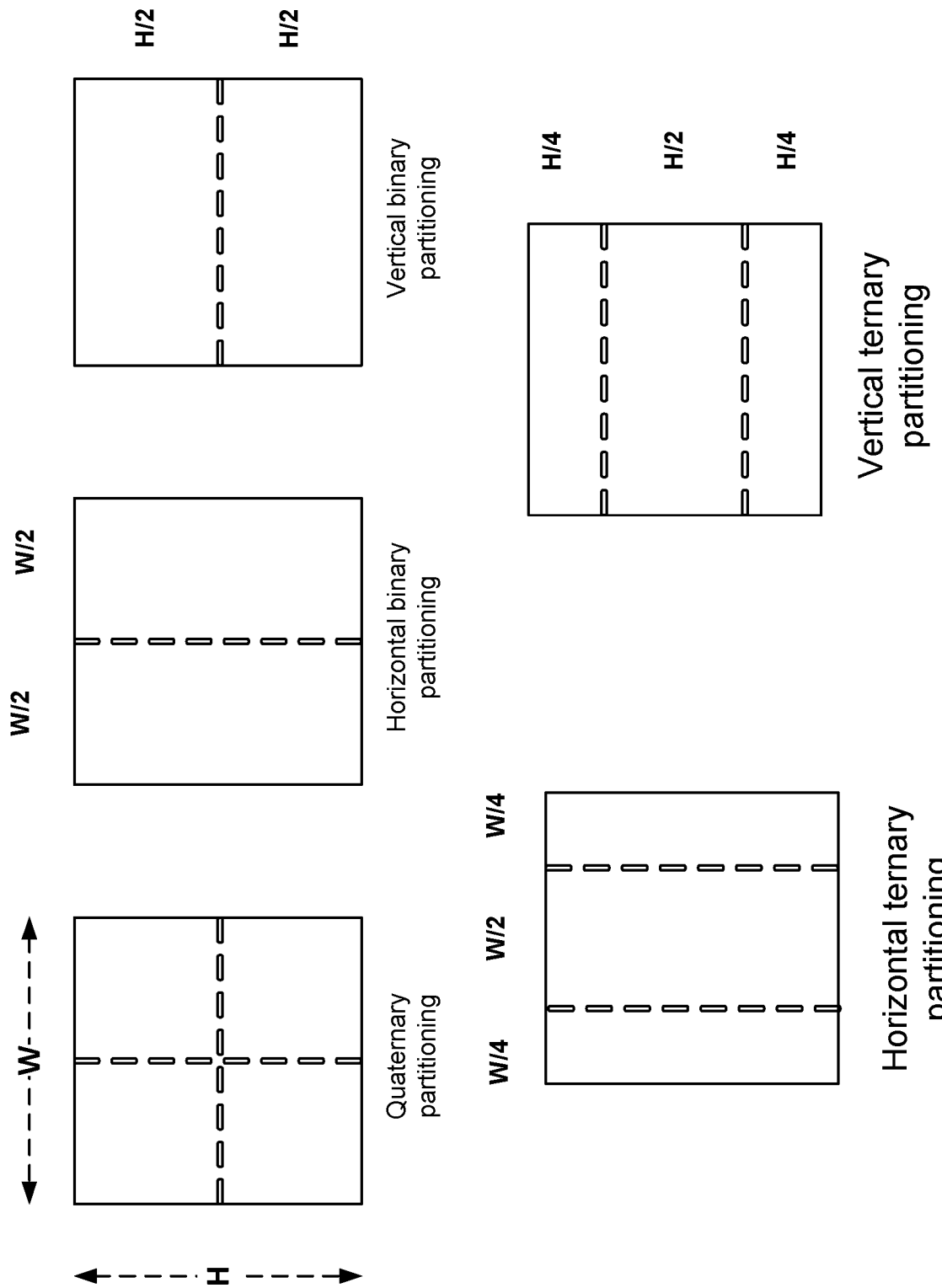

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
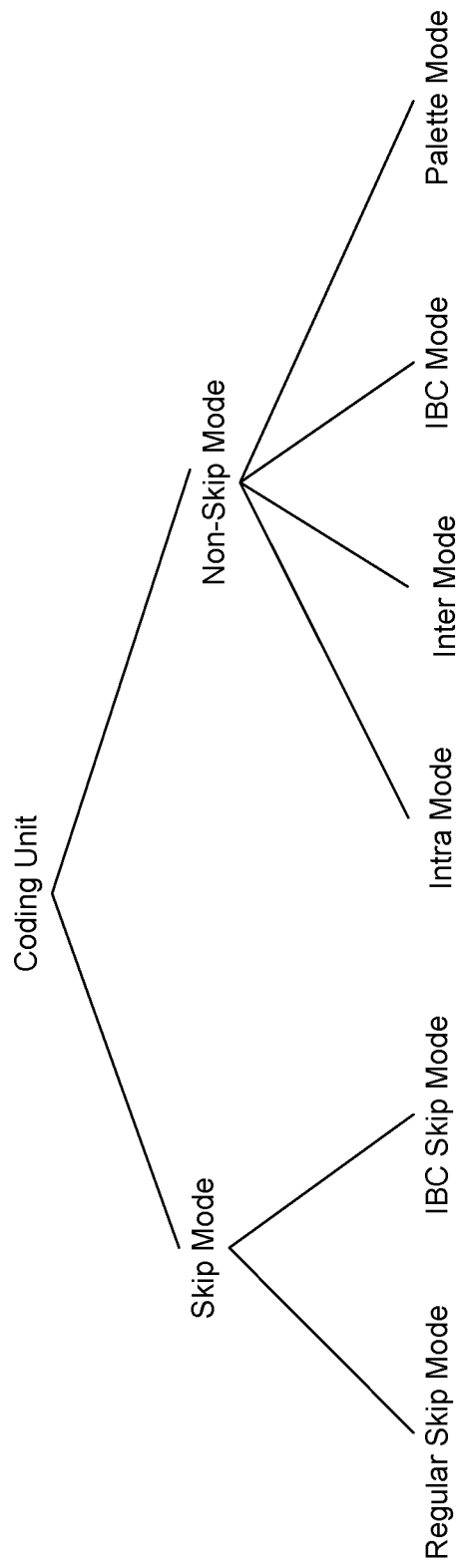
FIG. 5 is a block diagram illustrating different prediction modes of a coding unit in accordance with some implementations of the present disclosure.

FIG. 5 is a block diagram illustrating different prediction modes of a coding unit in accordance with some implementations of the present disclosure.

In VVC, each CU can be coded as skip mode or non-skip mode. For a CU coded as skip mode, one syntax element is further signaled to indicate whether the current CU is regular skip mode (similar to the skip mode in HEVC) or IBC skip mode. For a CU coded as non-skip mode, syntax elements are further signaled to indicate if the current CU is coded as intra mode, inter mode, intra block copy (IBC) mode or palette (PLT) mode. These modes are termed as "MODE_INTRA", "MODE_INTER", "MODE_IBC" and "MODE_PLT" respectively in the VVC specification. For a CU coded as intra mode, only the spatial neighboring reconstructed pixels in the same picture/slice could be used to generate the prediction signal for the current CU. For a CU coded as inter mode, the prediction signal can be generated by pixels from the reference pictures which are not the current picture. The detail of IBC mode could be found in document JVET-N1002 (at http://phenix.int-evry.fr/jvet/). The palette (PLT) mode is newly adopted into VVC in 15$^{th}$ JVET meeting with details explained in the document JVET-O0119 located at http://phenix.int-evry.fr/jvet/.

In the current VVC, the constraints and conditions for enabling each different mode are different, as summarized in Table 1 below. Moreover, a flag is signaled in sequence parameter set (SPS) to indicate the on/off of the IBC and PLT modes, i.e. indicating whether IBC and/or PLT mode are allowed in the associated bitstream.

TABLE 1

Constrains of enabling/signaling the non-skip related modes

Constraints of mode enabling/signaling

| | |
|---|---|
| intra mode | no constraints |
| inter mode | (block width x block height)>16 |
| IBC mode | block width <=64 && block height <=64 && sps_ibc_enabled_flag && treeType != DUAL_TREE_CHROMA |
| PLT mode | block width <=64 && block height <=64 && sps_plt_enabled_flag |

The syntax of the mode signaling in current VVC is illustrated in the table below.

TABLE 2

Syntax of prediction modes signaling in current VVC

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \| \| sps_ibc_enabled_flag \| \| sps_palette_enabled_flag) { | |
|     if( treeType != DUAL_TREE_CHROMA && | |
|       !( ( ( cbWidth = = 4 && cbHeight = = 4 ) \| \| modeType = = MODE_TYPE_INTRA ) | |
|       && !sps_ibc_enabled flag ) ) | |
|       cu_skip_flag[ x0 ][ y0 ] | ae(v) |
|   if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|     pred_mode_flag | ae(v) |

TABLE 2-continued

Syntax of prediction modes signaling in current VVC

| | Descriptor |
|---|---|
| if( ( ( slice_type = = I && cu_skip_flag[ x0 ][ y0 ] = = 0 ) \|\|<br>  ( slice_type != I && ( CuPredMode[ chType ][ x0 ][ y0 ] != MODE_INTRA \|\|<br>   ( cbWidth = = 4 && cbHeight = = 4 && cu_skip_flag[ x0 ][ y0 ] = = 0 ) ) ) )<br>&&<br>  cbWidth <= 64 && cbHeight <= 64 && modeType != MODE_TYPE_INTER<br>&&<br>  sps_ibc_enabled_flag && treeType != DUAL_TREE_CHROMA )<br> pred_mode_ibc_flag | ae(v) |
| if( ( ( ( slice_type = = I \|\| ( cbWidth = = 4 && cbHeight = = 4 ) \|\| sps_ibc_enabled_flag )<br>&&<br>   CuPredMode[ x0 ][ y0 ] = = MODE_INTRA ) \|\|<br>  ( slice_type != I && !( cbWidth = = 4 && cbHeight = = 4 ) &&<br>!sps_ibc_enabled_flag<br>   && CuPredMode[ x0 ][ y0 ] != MODE_INTRA ) ) &&<br>sps_palette_enabled_flag &&<br>  cbWidth <= 64 && cbHeight <= 64 && && cu_skip_flag[ x0 ][ y0 ] = = 0<br>&&<br>  modeType != MODE_INTER )<br> pred_mode_plt_flag<br>} | ae(v) |

The semantic of the mode signaling in current VVC is illustrated below.

cu_skip_flag[x0][y0] equal to 1 specifies that for the current coding unit, when decoding a P or B slice, no more syntax elements except one or more of the following are parsed after cu_skip_flag[x0][y0]: the IBC mode flag pred_mode_ibc_flag [x0][y0], and the merge_data( ) syntax structure; when decoding an I slice, no more syntax elements except merge_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture. When cu_skip_flag[x0][y0] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode. When pred_mode_flag is not present, it is inferred as follows:
- If cbWidth is equal to 4 and cbHeight is equal to 4, pred_mode_flag is inferred to be equal to 1.
- Otherwise, if modeType is equal to MODE_TYPE_INTRA, pred_mode_flag is inferred to be equal to 1.
- Otherwise, if modeType is equal to MODE_TYPE_INTER, pred_mode_flag is inferred to be equal to 0.
- Otherwise, pred_mode_flag is inferred to be equal to 1 when decoding an I slice, and equal to 0 when decoding a P or B slice, respectively.

The variable CuPredMode[chType][x][y] is derived as follows for x=x0 . . . x0+cbWidth−1 and y=y0 . . . y0+cbHeight−1:
- If pred_mode_flag is equal to 0, CuPredMode[chType][x][y] is set equal to MODE_INTER.
- Otherwise (pred_mode_flag is equal to 1), CuPredMode[chType][x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode. When pred_mode_ibc_flag is not present, it is inferred as follows:
- If cu_skip_flag[x0][y0] is equal to 1, and cbWidth is equal to 4, and cbHeight is equal to 4, pred_mode_ibc_flag is inferred to be equal 1.
- Otherwise, if both cbWidth and cbHeight are equal to 128, pred_mode_ibc_flag is inferred to be equal to 0.
- Otherwise, if modeType is equal to MODE_TYPE_INTER, pred_mode_ibc_flag is inferred to be equal to 0.
- Otherwise, if treeType is equal to DUAL_TREE_CHROMA, pred_mode_ibc_flag is inferred to be equal to 0.
- Otherwise, pred_mode_ibc_flag is infered to be equal to the value of sps_ibc_enabled_flag when decoding an I slice, and 0 when decoding a P or B slice, respectively.
- When pred_mode_ibc_flag is equal to 1, the variable CuPredMode[chType][x][y] is set to be equal to MODE_IBC for x=x0 . . . x0+cbWidth−1 and y=y0 . . . y0+cbHeight−1.

pred_mode_plt_flag specifies the use of palette mode in the current coding unit. pred_mode_plt_flag equal to 1 indicates that palette mode is applied in the current coding unit. pred_mode_plt_flag equal to 0 indicates that palette mode is not applied in the current coding unit. When pred_mode_plt_flag is not present, it is inferred to be equal to 0. When pred_mode_plt_flag is equal to 1, the variable CuPredMode[x][y] is set to be equal to MODE_PLT for x=x0 . . . x0+cbWidth−1 and y=y0 . . . y0+cbHeight−1.

To summarize, in current VVC, the syntax (i.e. the associated flags) signaled to indicate the corresponding non-skip modes is shown in Table 4 to Table 10, with each table corresponding to different conditions of prediction modes allowed. It should be noted that in these tables the 0 and 1 in the codewords may all be inverted and the resulted codewords would function equally. Moreover, the naming of the syntax elements can also be changed to other names without changing the function of the signaled modes.

TABLE 3

Signaling of the non-skip CU prediction modes in current VVC when
all the modes (inter, inter, IBC and PLT modes) are allowed

| Pred_Modes | pred_mode_flag | pred_mode_ibc_flag | pred_mode_plt_flag |
|---|---|---|---|
| INTER | 0 | 0 | — |
| IBC | 0 | 1 | — |
| PLT | 1 | — | 1 |
| INTRA | 1 | — | 0 |

TABLE 4

Signaling of the non-skip CU modes in current VVC when
only intra, IBC and PLT modes are allowed

| Pred_Modes | pred_mode_flag | pred_mode_ibc_flag | pred_mode_plt_flag |
|---|---|---|---|
| IBC | — | 1 | — |
| PLT | — | 0 | 1 |
| INTRA | — | 0 | 0 |

TABLE 5

Signaling of the non-skip CU modes in current VVC when
only intra, inter and PLT modes are allowed

| Pred_Modes | pred_mode_flag | pred_mode_ibc_flag | pred_mode_plt_flag |
|---|---|---|---|
| INTER | 0 | — | 0 |
| PLT | 0 | — | 1 |
| INTRA | 1 | — | — |

TABLE 6

Signaling of the non-skip CU modes in current
VVC when only intra, inter and IBC modes are allowed

| Pred_Modes | pred_mode_flag | pred_mode_ibc_flag | pred_mode_plt_flag |
|---|---|---|---|
| INTER | 0 | 0 | — |
| IBC | 0 | 1 | — |
| INTRA | 1 | — | — |

TABLE 7

Signaling of the non-skip CU modes in current VVC when
only intra and IBC modes are allowed

| Pred_Modes | pred_mode_flag | pred_mode_ibc_flag | pred_mode_plt_flag |
|---|---|---|---|
| IBC | — | 1 | — |
| INTRA | — | 0 | — |

TABLE 8

Signaling of the non-skip CU modes in current VVC
when only intra and PLT modes are allowed

| Pred_Modes | pred_mode_flag | pred_mode_ibc_flag | pred_mode_plt_flag |
|---|---|---|---|
| PLT | — | — | 1 |
| INTRA | — | — | 0 |

TABLE 9

Signaling of the non-skip CU modes in current VVC
when only intra and inter modes are allowed

| Pred_Modes | pred_mode_flag | pred_mode_ibc_flag | pred_mode_plt_flag |
|---|---|---|---|
| INTER | 0 | — | — |
| INTRA | 1 | — | — |

Figure 6:
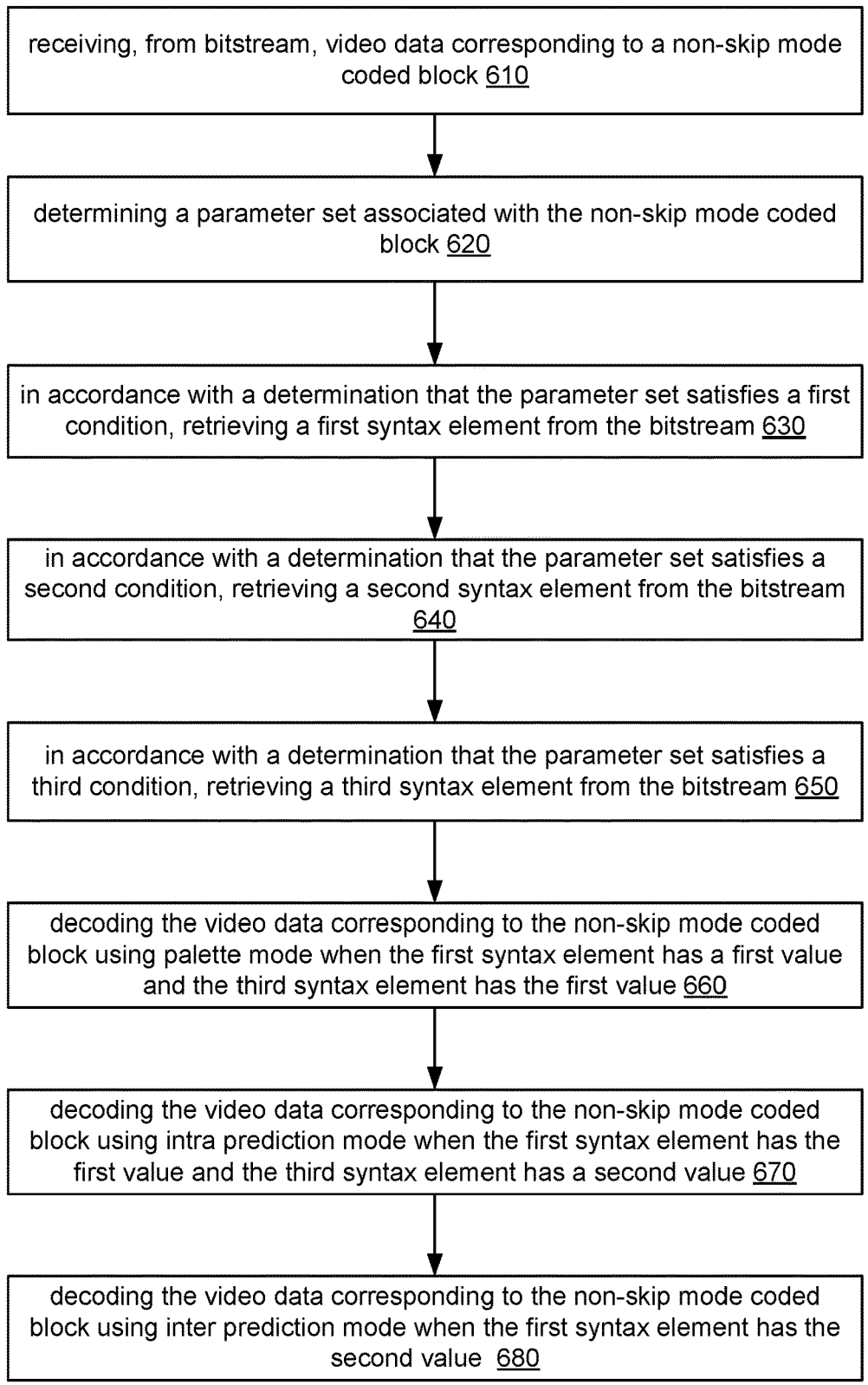
FIG. 6 is a flowchart illustrating an exemplary process by which a video coder implements the techniques of signaling prediction mode in accordance with some implementations of the present disclosure.

FIG. 6 is a flowchart illustrating an exemplary process by which a video coder implements the techniques of signaling prediction mode in accordance with some implementations of the present disclosure.

In current VVC, the IBC mode is regarded as a mode which is more similar to the inter mode while the PLT mode is regarded as a mode more similar to the intra mode. Therefore, in VVC, the IBC mode flag (pred_mode_ibc_flag) is signaled when the pred_mode_flag is signaled as 0 which implies the current CU is inter mode alike. The PLT mode flag (pred_mode_plt_flag) is signaled when the pred_mode_flag is signaled as 1 which implies the current CU is intra mode alike. However, there is one exception when only intra, inter and PLT modes are allowed (i.e. IBC mode is not allowed). As shown in Table 5, The PLT mode flag (pred_mode_plt_flag) is signaled when the pred_mode_flag is signaled as 0. Such an exception not only breaks the physical meaning of the flag of pred_mode_flag, it also complicates the signaling conditions of pred_mode_plt_flag because different signaling conditions are used depending on whether IBC mode is allowed or not.

Moreover, in current VVC, the condition checking to signal the pred_mode_ibc_flag and pred_mode_plt_flag is complex as shown in Table 2. Several methods are proposed to simplify the condition checking in signaling these prediction modes.

According to the first embodiment of the disclosure, the flag to indicate the enabling of the palette mode (e.g. pred_mode_plt_flag in VVC specification) is signaled only under intra-like mode, regardless of the conditions of prediction modes allowed. In one example, only when the syntax element used to indicate the intra-like or inter-like mode (e.g. pred_mode_flag) is signaled or inferred as intra-like mode (e.g. signaling pred_mode_flag as 1 in current VVC), the palette mode flag pred_mode_plt_flag is signaled. According to the embodiment, when only inter, intra and PLT modes are allowed, the corresponding codewords are illustrated in Table 10. It is different from Table 5. Moreover, the signaling conditions of pred_mode_plt_flag can be simplified as highlighted in Table 11.

TABLE 10

Signaling of the non-skip CU modes when only intra, inter and
PLT modes are allowed based on the first embodiment

| Pred_Modes | pred_mode_flag | pred_mode_ibc_flag | pred_mode_plt_flag |
|---|---|---|---|
| INTER | 0 | — | — |
| PLT | 1 | — | 1 |
| INTRA | 1 | — | 0 |

TABLE 11

Syntax of proposed mode signaling for VVC (the modified parts are highlighted)

| | Descriptor |
|---|---|
| coding_unit( x0, y0, cbWidth, cbHeight, cqtDepth, treeType, modeType ) {<br>  chType = treeType = = DUAL_TREE_CHROMA? 1 : 0<br>  if( slice_type != I \| \| sps_ibc_enabled_flag \| \| sps_palette_enabled_flag) {<br>    if( treeType != DUAL_TREE_CHROMA &&<br>      !( ( ( cbWidth = = 4 && cbHeight = = 4 ) \| \| modeType = = MODE_TYPE_INTRA )<br>      && !sps_ibc_enabled_flag ) )<br>      cu_skip_flag[ x0 ][ y0 ] | ae(v) |
|     if( cu_skip_flag[ x0 ][ y0 ] = = 0 && slice_type != I<br>      && !( cbWidth = = 4 && cbHeight = = 4 ) && modeType = = MODE_TYPE_ALL )<br>      pred_mode_flag | ae(v) |
|     if( ( ( slice_type = = I && cu_skip_flag[ x0 ][ y0 ] = = 0 ) \| \|<br>      ( slice_type != I && ( CuPredMode[ chType ][ x0 ][ y0 ] != MODE_INTRA \| \|<br>        ( cbWidth = = 4 && cbHeight = = 4 && cu_skip_flag[ x0 ][ y0 ] = = 0 ) ) ) ) &&<br>      cbWidth <= 64 && cbHeight <= 64 && modeType != MODE_TYPE_INTER &&<br>      sps_ibc_enabled_flag && treeType != DUAL_TREE_CHROMA )<br>      pred_mode_ibc_flag | ae(v) |
|   if( ( CuPredMode[ x0 ][ y0 ] = = MODE_INTRA ) && sps_palette_enabled_flag &&<br>      cbWidth <= 64 && cbHeight <= 64 && cu_skip_flag[ x0 ][ y0 ] = = 0 &&<br>      modeType != MODE_INTER )<br>    pred_mode_plt_flag | ae(v) |
|   }<br>(...the rest of the spec for the coding unit)<br>} | |

According to the second embodiment of the disclosure, the modes are signaled based on a predefined order, with each mode indicated through a corresponding flag except the very last mode. The very last mode does not need a corresponding flag because it can be inferred as enabled when all the previously signaled modes (or flags) are not enabled. In one example, inter mode, IBC mode and PLT mode are respectively indicated through a flag pred_mode_inter_flag, pred_mode_ibc_flag and pred_mode_plt_flag. In this case, the method is basically identical to assigning the truncated binary codewords to the modes based on a predefined order of signaling. The associated codewords are illustrated in Table 12 to Table 18. The signaling conditions of pred_mode_ibc_flag and pred_mode_plt_flag can also be simplified, as highlighted in Table 19.

TABLE 12

Signaling of the non-skip CU modes when all the modes (inter, inter, IBC and PLT modes) are allowed, based on the second embodiment

| Pred_Modes | pred_mode_inter_flag | pred_mode_ibc_flag | pred_mode_plt_flag |
|---|---|---|---|
| INTER | 1 | — | — |
| IBC | 0 | 1 | — |
| PLT | 0 | 0 | 1 |
| INTRA | 0 | 0 | 0 |

TABLE 13

Signaling of the non-skip CU modes when only intra, IBC and PLT modes are allowed, based on the second embodiment

| Pred_Modes | pred_mode_inter_flag | pred_mode_ibc_flag | pred_mode_plt_flag |
|---|---|---|---|
| IBC | — | 1 | — |
| PLT | — | 0 | 1 |
| INTRA | — | 0 | 0 |

TABLE 14

Signaling of the non-skip CU modes when only intra, inter and PLT modes are allowed, based on the second embodiment

| Pred_Modes | pred_mode_inter_flag | pred_mode_ibc_flag | pred_mode_plt_flag |
|---|---|---|---|
| INTER | 1 | — | — |
| PLT | 0 | — | 1 |
| INTRA | 0 | — | 0 |

TABLE 15

Signaling of the non-skip CU modes when only intra, inter and IBC modes are allowed, based on the second embodiment

| Pred_Modes | pred_mode_inter_flag | pred_mode_ibc_flag | pred_mode_plt_flag |
|---|---|---|---|
| INTER | 1 | — | — |
| IBC | 0 | 1 | — |
| INTRA | 0 | 0 | — |

TABLE 16

Signaling of the non-skip CU modes when only intra and IBC modes are allowed, based on the second embodiment

| Pred_Modes | pred_mode_inter_flag | pred_mode_ibc_flag | pred_mode_plt_flag |
|---|---|---|---|
| IBC | — | 1 | — |
| INTRA | — | 0 | — |

TABLE 17

Signaling of the non-skip CU modes when only intra and PLT modes are allowed, based on the second embodiment

| Pred_Modes | pred_mode_inter_flag | pred_mode_ibc_flag | pred_mode_plt_flag |
|---|---|---|---|
| PLT | — | — | 1 |
| INTRA | — | — | 0 |

TABLE 18

Signaling of the non-skip CU modes when only intra and inter modes are allowed, based on the second embodiment

| Pred_Modes | pred_mode_inter_flag | pred_mode_ibc_flag | pred_mode_plt_flag |
|---|---|---|---|
| INTER | 1 | — | — |
| INTRA | 0 | — | — |

TABLE 19

Syntax of proposed mode signaling for VVC (the modified parts are highlighted)

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|       !( ( ( cbWidth = = 4 && cbHeight = = 4 )\|\| modeType = = MODE_TYPE_INTRA ) | |
|         && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) && modeType = = MODE_TYPE_ALL ) | |
|       pred_mode_inter_flag | ae(v) |
|     if( ( ( slice_type = = I && cu_skip_flag[ x0 ][ y0 ] = = 0 ) \|\| | |
|         ( slice_type != I && CuPredMode[ x0 ][ y0 ] = = MODE_INTRA ) ) && | |
|         cbWidth <= 64 && cbHeight <= 64 && modeType != MODE_TYPE_INTER && | |
|         sps_ibc_enabled_flag && treeType != DUAL_TREE_CHROMA ) | |
|       pred_mode_ibc_flag | ae(v) |
|     if( ( CuPredMode[ x0 ][ y0 ] = = MODE_INTRA ) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|       pred_mode_plt_flag | ae(v) |
| } | |

According to the third embodiment of the disclosure, the modes are signaled by first sending a syntax element to indicate whether the regular modes (such as inter and intra modes) or the new modes (such as the IBC and PLT modes) are used by the current block. After the first syntax element, additional syntax elements are signaled to indicate which mode is used. The associated codewords are illustrated in Table 20 to Table 26. It is noted that naming of the codeword bins (or flags) is changed to reflect their physical meaning according to this embodiment.

TABLE 20

Signaling of the non-skip CU modes when all the modes (inter, inter, IBC and PLT modes) are allowed, based on the third embodiment

| Pred_Modes | pred_mode_regular_flag | pred_mode_inter_flag | pred_mode_ibc_flag |
|---|---|---|---|
| INTER | 1 | 1 | — |
| IBC | 0 | — | 1 |
| PLT | 0 | — | 0 |
| INTRA | 1 | 0 | — |

TABLE 21

Signaling of the non-skip CU modes when only intra, IBC and PLT modes are allowed, based on the third embodiment

| Pred_Modes | pred_mode_regular_flag | pred_mode_inter_flag | pred_mode_ibc_flag |
|---|---|---|---|
| IBC | 0 | — | 1 |
| PLT | 0 | — | 0 |
| INTRA | 1 | — | — |

TABLE 22

Signaling of the non-skip CU modes when only intra, inter and PLT modes are allowed, based on the third embodiment

| Pred_Modes | pred_mode_regular_flag | pred_mode_inter_flag | pred_mode_ibc_flag |
|---|---|---|---|
| INTER | 1 | 1 | — |
| PLT | 0 | — | — |
| INTRA | 1 | 0 | — |

TABLE 23

Signaling of the non-skip CU modes when only intra, inter and IBC modes are allowed, based on the third embodiment

| Pred_Modes | pred_mode_regular_flag | pred_mode_inter_flag | pred_mode_ibc_flag |
|---|---|---|---|
| INTER | 1 | 1 | — |
| IBC | 0 | — | — |
| INTRA | 1 | 0 | — |

TABLE 24

Signaling of the non-skip CU modes when only intra and IBC modes are allowed, based on the third embodiment

| Pred_Modes | pred_mode_regular_flag | pred_mode_inter_flag | pred_mode_ibc_flag |
|---|---|---|---|
| IBC | 0 | — | — |
| INTRA | 1 | — | — |

TABLE 25

Signaling of the non-skip CU modes when only intra and PLT modes are allowed, based on the third embodiment

| Pred_Modes | pred_mode_regular_flag | pred_mode_inter_flag | pred_mode_ibc_flag |
|---|---|---|---|
| PLT | 0 | — | — |
| INTRA | 1 | — | — |

TABLE 26

Signaling of the non-skip CU modes when only intra and inter modes are allowed, based on the third embodiment

| Pred_Modes | pred_mode_regular_flag | pred_mode_inter_flag | pred_mode_ibc_flag |
|---|---|---|---|
| INTER | — | 1 | — |
| INTRA | — | 0 | — |

To signal a prediction mode, the video coder first receives, from bitstream, video data corresponding to a non-skip mode coded block (610) and determines a parameter set associated with the non-skip mode coded block (620). The parameter set (e.g., a sequence parameter set) includes information to include which mode (e.g., IBC, PLT, etc) is allowed in the associated bitstream, as indicated by Table 1.

Next, the video coder selectively receives a first, second, or third syntax elements from the bitstream. If the parameter set includes information that satisfies a first condition, the video coder retrieves a first syntax element (e.g., pre_mode_flag in Table 2) from the bitstream (630). If the parameter set includes information that satisfies a second condition, the video coder retrieves a second syntax element (e.g., pre_mode_ibc_flag in Table 2) from the bitstream (640). If the parameter set includes information that satisfies a third condition, the video coder retrieves a third syntax element (e.g., pre_mode_plt_flag in Table 2) from the bitstream (650). For the conditions associated with each of the respective syntax elements, refer to Table 2. In some embodiments, if a respective condition is not satisfied, the video coder does not receive the respective syntax element (e.g., the video coder may assign default values to the syntax elements or do not use the syntax elements during decoding).

Next, the video coder decodes the video data corresponding to the non-skip mode coded block using a respective mode, depending on the values of the received first, second, and third syntax elements. In particular:

The video coder decodes the video data using palette mode when both the first syntax element (e.g, pred_mode_flag in Table 1) and the third syntax element (e.g., pre_mode_plt_flag in Table 1) have a first value (e.g., "1"), and the second condition is not satisfied (e.g., the video coder does not receive pre_mode_ibc_flag) (660).

The video coder decodes the video data using intra prediction mode when the first syntax element (e.g., pred_mode_flag in Table 1) has the first value (e.g., "1") and the third syntax element has a second value (e.g., "0"). The second condition is not satisfied (e.g., the video coder does not receive pred_mode_ibc_flag) (670).

The video coder decodes the video data using inter prediction mode when the first syntax element has the second value (e.g., "0") and the second and the third conditions are not satisfied (e.g., the video coder does not receive pred_mode_ibc_flag and pre_mode_plt_flag) (680).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, the method comprising:
    receiving, from bitstream, video data corresponding to a non-skip mode coded block;
    determining a parameter set associated with the non-skip mode coded block;
    in accordance with a determination that the parameter set includes information that satisfies a first condition, retrieving a first syntax element from the bitstream;
    in accordance with a determination that the parameter set includes information that satisfies a second condition, retrieving a second syntax element from the bitstream;
    in accordance with a determination that the parameter set includes information that satisfies a third condition, retrieving a third syntax element from the bitstream;
    decoding the video data corresponding to the non-skip mode coded block using palette mode when the first syntax element has a first value and the third syntax element has the first value;
    decoding the video data corresponding to the non-skip mode coded block using intra prediction mode when the first syntax element has the first value and the third syntax element has a second value; and
    decoding the video data corresponding to the non-skip mode coded block using inter prediction mode when the first syntax element has the second value.

2. The method of claim 1, wherein when the video data corresponding to the non-skip mode coded block is decoded using the palette mode, the second condition is not satisfied and the second syntax element is not received.

3. The method of claim 1, wherein when the video data corresponding to the non-skip mode coded block is decoded using the intra prediction mode, the second condition is not satisfied and the second syntax element is not received.

4. The method of claim 1, wherein when the video data corresponding to the non-skip mode coded block is decoded using the inter prediction mode, the second and the third conditions are not satisfied and the second and the third syntax elements are not received.

5. The method of claim 1, further comprising:
    decoding the video data corresponding to the non-skip mode coded block using intra block copy mode when the first syntax element has a second value or the first syntax element is not received, the second syntax element has the first value, and the third syntax element is not received.

6. A computing device comprising:
    one or more processors;
    memory coupled to the one or more processors; and
    a plurality of programs stored in the memory that, when executed by the one or more processors, cause the computing device to perform operations comprising:
    receiving, from bitstream, video data corresponding to a non-skip mode coded block;
    determining a parameter set associated with the non-skip mode coded block;
    in accordance with a determination that the parameter set includes information that satisfies a first condition, retrieving a first syntax element from the bitstream;
    in accordance with a determination that the parameter set includes information that satisfies a second condition, retrieving a second syntax element from the bitstream;
    in accordance with a determination that the parameter set includes information that satisfies a third condition, retrieving a third syntax element from the bitstream;
    decoding the video data corresponding to the non-skip mode coded block using palette mode when the first syntax element has a first value and the third syntax element has the first value;
    decoding the video data corresponding to the non-skip mode coded block using intra prediction mode when the first syntax element has the first value and the third syntax element has a second value; and
    decoding the video data corresponding to the non-skip mode coded block using inter prediction mode when the first syntax element has the second value.

7. The device of claim 6, wherein when the video data corresponding to the non-skip mode coded block is decoded using the palette mode, the second condition is not satisfied and the second syntax element is not received.

8. The device of claim 6, wherein when the video data corresponding to the non-skip mode coded block is decoded using the intra prediction mode, the second condition is not satisfied and the second syntax element is not received.

9. The device of claim 6, wherein when the video data corresponding to the non-skip mode coded block is decoded using the inter prediction mode, the second and the third conditions are not satisfied and the second and the third syntax elements are not received.

10. The device of claim 6, the operations further comprising:
    decoding the video data corresponding to the non-skip mode coded block using intra block copy mode when the first syntax element has a second value or the first syntax element is not received, the second syntax element has the first value, and the third syntax element is not received.

11. A non-transitory computer-readable storage medium storing computer-readable instructions that, when executed by a decoding apparatus, cause the decoding apparatus to perform operations comprising:
    receiving, from bitstream, video data corresponding to a non-skip mode coded block;
    determining a parameter set associated with the non-skip mode coded block;
    in accordance with a determination that the parameter set includes information that satisfies a first condition, retrieving a first syntax element from the bitstream;
    in accordance with a determination that the parameter set includes information that satisfies a second condition, retrieving a second syntax element from the bitstream;
    in accordance with a determination that the parameter set includes information that satisfies a third condition, retrieving a third syntax element from the bitstream;

decoding the video data corresponding to the non-skip mode coded block using palette mode when the first syntax element has a first value and the third syntax element has the first value;

decoding the video data corresponding to the non-skip mode coded block using intra prediction mode when the first syntax element has the first value and the third syntax element has a second value; and decoding the video data corresponding to the non-skip mode coded block using inter prediction mode when the first syntax element has the second value.

12. The non-transitory computer-readable storage medium of claim 11, wherein when the video data corresponding to the non-skip mode coded block is decoded using the palette mode, the second condition is not satisfied and the second syntax element is not received.

13. The non-transitory computer-readable storage medium of claim 11, wherein when the video data corresponding to the non-skip mode coded block is decoded using the intra prediction mode, the second condition is not satisfied and the second syntax element is not received.

14. The non-transitory computer-readable storage medium of claim 11, wherein when the video data corresponding to the non-skip mode coded block is decoded using the inter prediction mode, the second and the third conditions are not satisfied and the second and the third syntax elements are not received.

15. The non-transitory computer-readable storage medium of claim 11, wherein the operations further comprise:

decoding the video data corresponding to the non-skip mode coded block using intra block copy mode when the first syntax element has a second value or the first syntax element is not received, the second syntax element has the first value, and the third syntax element is not received.

* * * * *